(12) United States Patent
Pishe

(10) Patent No.: US 11,004,078 B2
(45) Date of Patent: May 11, 2021

(54) SYSTEM, METHOD, AND COMPUTER PROGRAM PRODUCT FOR PERFORMING ANALYSIS OF TRANSACTION DATA

(71) Applicant: Visa International Service Association, San Francisco, CA (US)

(72) Inventor: Naveen Pishe, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 477 days.

(21) Appl. No.: 15/645,118

(22) Filed: Jul. 10, 2017

(65) Prior Publication Data

US 2019/0012670 A1     Jan. 10, 2019

(51) Int. Cl.
| | | |
|---|---|---|
| *G06Q 20/40* | (2012.01) | |
| *G06Q 20/38* | (2012.01) | |
| *G06Q 20/42* | (2012.01) | |
| *G06Q 30/02* | (2012.01) | |

(52) U.S. Cl.
CPC ....... *G06Q 20/4016* (2013.01); *G06Q 20/382* (2013.01); *G06Q 20/405* (2013.01); *G06Q 20/425* (2013.01); *G06Q 30/0207* (2013.01)

(58) Field of Classification Search
None
See application file for complete search history.

(56) References Cited

U.S. PATENT DOCUMENTS

| | | | |
|---|---|---|---|
| 6,058,267 A | | 5/2000 | Kanai et al. |
| 10,169,757 B1 * | | 1/2019 | Vippagunta ............. G06F 16/24 |
| 2008/0077499 A1 | | 3/2008 | Ariff et al. |
| 2010/0211499 A1 | | 8/2010 | Zanzot et al. |
| 2013/0024300 A1 * | | 1/2013 | Choudhuri ........... G06Q 30/018 705/16 |
| 2014/0279309 A1 * | | 9/2014 | Cowen ............... G06Q 20/4016 705/30 |
| 2016/0063501 A1 * | | 3/2016 | Kalyan ................ G06Q 20/108 705/42 |
| 2016/0275495 A1 * | | 9/2016 | Sharan ................... G06Q 20/38 |
| 2017/0352022 A1 * | | 12/2017 | Senci .................... G06Q 20/405 |
| 2017/0364577 A1 * | | 12/2017 | Purcell .................. G06F 16/951 |
| 2018/0285978 A1 * | | 10/2018 | Groarke ................. G06Q 40/08 |

OTHER PUBLICATIONS

"Introducing JSON," retrieved from <https://web.archive.org/web/20170401203516/https://www.json.org/json-en.html> on Feb. 3, 2020.*

* cited by examiner

*Primary Examiner* — Jamie R Kucab
(74) *Attorney, Agent, or Firm* — The Webb Law Firm

(57) ABSTRACT

Provided is a computer-implemented method for performing analysis of transaction data. The method may include receiving streaming data, wherein the streaming data comprises a plurality of data identifiers and transaction data associated with each transaction of a plurality of transactions, wherein each data identifier is associated with transaction data associated with a transaction so that the transaction data associated with each transaction is separated by a data identifier, filtering the streaming data using at least one predetermined data identifier value to provide filtered transaction data, determining whether the filtered transaction data corresponds to at least one predetermined transaction parameter, and asynchronously storing the filtered transaction data associated with the at least one transaction in at least one data structure. A system and computer program product are also disclosed.

18 Claims, 7 Drawing Sheets

SYSTEM, METHOD, AND COMPUTER PROGRAM PRODUCT FOR PERFORMING ANALYSIS OF TRANSACTION DATA

BACKGROUND OF THE INVENTION

1. Field of the Invention

This invention relates generally to systems, devices, products, apparatus, and methods that performing analysis of transaction data and, in one particular embodiment, to a system, product, and method for performing analysis on transaction data to determine fraudulent activity.

2. Technical Considerations

Fraud can be committed through various media, including mail, wire, phone, and the Internet (computer crime and Internet fraud). International aspects of the Internet and ease with which an actor can hide the actor's location, the difficulty of checking identity and legitimacy online, and the simplicity with which actors can divert browsers to dishonest sites and steal credit card details have all contributed to the very rapid growth of fraud.

Credit card fraud is a wide-ranging term for theft and fraud committed using or involving a payment card, such as a credit card or debit card, as a fraudulent source of funds in a transaction. The purpose of credit card fraud may be for an actor to obtain goods without paying or for an actor to obtain unauthorized funds from an account. Credit card fraud may also be an adjunct act committed as part of identity theft.

However, detecting credit card fraud may involve analyzing large amounts of data to make determinations on whether an act of credit card fraud has been committed. The amount of data to be analyzed may be voluminous, to the point at which analysis of such large amounts of data is problematic for current systems. For example, analysis of such data may burden processing and storage resources causing issues such as latency.

SUMMARY OF THE INVENTION

Accordingly, it is an object of the present invention to provide systems, devices, products, apparatus, and/or methods for performing analysis of transaction data that overcomes some or all of the deficiencies of the prior art. According to a non-limiting embodiment, provided is a computer-implemented method for performing analysis of transaction data. The computer-implemented method comprises receiving, with at least one processor, at least one predetermined data identifier value, wherein the at least one predetermined data identifier value is associated with at least one of information associated with a merchant data, information associated with an issuer institution, or any combination thereof; receiving, with at least one processor, streaming data, wherein the streaming data comprises a plurality of data identifiers and transaction data associated with each transaction of a plurality of transactions, wherein each transaction involves at least one merchant and at least one consumer, wherein each data identifier of the plurality of data identifiers is associated with transaction data associated with a transaction so that the transaction data associated with each transaction is separated by a data identifier; filtering, with at least one processor, the streaming data using the at least one predetermined data identifier value to provide filtered data, wherein the filtered data comprises filtered transaction data associated with at least one transaction; determining, with at least one processor, whether the filtered transaction data associated with the at least one transaction corresponds to at least one predetermined transaction parameter; and asynchronously storing, with at least one processor, the filtered transaction data associated with the at least one transaction in at least one data structure based on determining that the filtered transaction data associated with the at least one transaction corresponds to the at least one predetermined transaction parameter.

According to a non-limiting embodiment, provided is a system for performing analysis of transaction data. The system comprises at least one processor, wherein the at least one processor is programmed or configured to: receive at least one predetermined data identifier value, wherein the at least one predetermined data identifier value is associated with at least one of information associated with a merchant data, information associated with an issuer institution, or any combination thereof; receive streaming data, wherein the streaming data comprises a plurality of data identifiers and transaction data associated with each transaction of a plurality of transactions, wherein each transaction involves at least one merchant and at least one consumer, wherein each data identifier of the plurality of data identifiers is associated with transaction data associated with a transaction so that the transaction data associated with each transaction is separated by a data identifier; filter the streaming data using the at least one predetermined data identifier value to provide filtered data, wherein the filtered data comprises filtered transaction data associated with at least one transaction; determine whether the filtered transaction data associated with the at least one transaction corresponds to at least one predetermined transaction activity parameter based on filtering the streaming data using the at least one predetermined data identifier value; and asynchronously store the filtered transaction data associated with the at least one transaction in at least one data structure based on determining that the filtered transaction data associated with the at least one transaction corresponds to the at least one predetermined transaction activity parameter.

According to a non-limiting embodiment, provided is a computer program product for performing analysis of transaction data. The computer program product comprises at least one non-transitory computer-readable medium including one or more instructions that, when executed by at least one processor, cause the at least one processor to: receive at least one predetermined data identifier value, wherein the at least one predetermined data identifier value is associated with at least one of information associated with a merchant data, information associated with an issuer institution, or any combination thereof; receive streaming data, wherein the streaming data comprises a plurality of data identifiers and transaction data associated with each transaction of a plurality of transactions, wherein each transaction involves at least one merchant and at least one consumer, wherein each data identifier of the plurality of data identifiers is associated with transaction data associated with a transaction so that the transaction data associated with each transaction is separated by a data identifier; filter the streaming data using the at least one predetermined data identifier value to provide filtered data, wherein the filtered data comprises filtered transaction data associated with at least one transaction; determine whether the filtered transaction data associated with the at least one transaction corresponds to at least one predetermined transaction parameter based on filtering the streaming data using the at least one predetermined data identifier value; asynchronously store the filtered transaction data associated with the at least one transaction in a first data structure based on determining that the filtered transaction data associated with the at least one transaction corresponds to the at least one predetermined transaction parameter; and asynchronously store the filtered transaction data associated with the at least one transaction in a second data structure based on a pull notification, wherein the pull notification is based on an availability of the second data structure to store the filtered transaction data.

Further embodiments or aspects are set forth in the following numbered clauses:

Clause 1: A computer-implemented method for performing analysis of transaction data, comprising: receiving, with at least one processor, at least one predetermined data identifier value, wherein the at least one predetermined data identifier value is associated with at least one of information associated with a merchant data, information associated with an issuer institution, or any combination thereof; receiving, with at least one processor, streaming data, wherein the streaming data comprises a plurality of data identifiers and transaction data associated with each transaction of a plurality of transactions, wherein each transaction involves at least one merchant and at least one consumer, wherein each data identifier of the plurality of data identifiers is associated with transaction data associated with a transaction so that the transaction data associated with each transaction is separated by a data identifier; filtering, with at least one processor, the streaming data using the at least one predetermined data identifier value to provide filtered data, wherein the filtered data comprises filtered transaction data associated with at least one transaction; determining, with at least one processor, whether the filtered transaction data associated with the at least one transaction corresponds to at least one predetermined transaction parameter; and asynchronously storing, with at least one processor, the filtered transaction data associated with the at least one transaction in at least one data structure based on determining that the filtered transaction data associated with the at least one transaction corresponds to the at least one predetermined transaction parameter.

Clause 2: The computer-implemented method of clause 1, wherein the at least one data structure comprises a distributed data structure associated with a transaction service provider system.

Clause 3: The computer-implemented method of clauses 1 or 2, wherein determining whether the filtered transaction data corresponds to the at least one predetermined transaction parameter comprises: determining that the filtered transaction data associated with a plurality of transactions corresponds to the at least one predetermined transaction parameter, wherein asynchronously storing the filtered transaction data in the at least one data structure comprises: storing the filtered transaction data associated with the plurality of transactions in the at least one data structure as a batch in a single time interval.

Clause 4: The computer-implemented method of any of clauses 1-3, wherein asynchronously storing the filtered transaction data in the at least one data structure comprises: asynchronously storing the filtered transaction data in the at least one data structure based on a pull notification, wherein the pull notification is based on availability of the at least one data structure.

Clause 5: The computer-implemented method of any of clauses 1-4, wherein asynchronously storing the filtered transaction data in the at least one data structure comprises: asynchronously storing the filtered transaction data in at least one NoSQL data structure.

Clause 6: The computer-implemented method of any of clauses 1-5, wherein storing the filtered transaction data in the at least one data structure comprises: storing the filtered transaction data in a first data structure; communicating the filtered transaction data to a second data structure; and storing the filtered transaction data in the second data structure, wherein the first data structure and the second data structure store data in a same data format.

Clause 7: The computer-implemented method of any of clauses 1-6, wherein the streaming data comprises real-time transaction data.

Clause 8: The computer-implemented method of any of clauses 1-7, further comprising: partitioning the streaming data before receiving the streaming data to provide first partitioned streaming data and second partitioned streaming data; and communicating the first partitioned streaming data and the second partitioned streaming data based on partitioning the streaming data, wherein receiving the streaming data comprises: receiving the first partitioned streaming data and the second partitioned streaming data.

Clause 9: The computer-implemented method of any of clauses 1-8, further comprising communicating a notification message based on determining that the filtered transaction data associated with the at least one transaction corresponds to the at least one predetermined transaction parameter.

Clause 10: The computer-implemented method of any of clauses 1-9, further comprising storing the filtered transaction data in a memory storage device associated with the at least one processor before storing the filtered transaction data in the at least one data structure.

Clause 11: The computer-implemented method of any of clauses 1-10, wherein each of the plurality of data identifiers comprises a key of a plurality of key value pairs, and wherein each portion of the transaction data comprises a value of the plurality of key value pairs.

Clause 12: The computer-implemented method of any of clauses 1-11, wherein the streaming data is received in a serial data format, the method further comprising: deserializing the streaming data into a deserialized data format, and wherein filtering the streaming data using the at least one predetermined data identifier value to provide filtered data comprises: filtering the streaming data using the at least one predetermined data identifier value to provide filtered data, wherein the filtered data comprises the deserialized data format.

Clause 13: A system for performing analysis of transaction data, comprising: at least one processor, wherein the at least one processor is programmed or configured to: receive at least one predetermined data identifier value, wherein the at least one predetermined data identifier value is associated with at least one of information associated with a merchant data, information associated with an issuer institution, or any combination thereof; receive streaming data, wherein the streaming data comprises a plurality of data identifiers and transaction data associated with each transaction of a plurality of transactions, wherein each transaction involves at least one merchant and at least one consumer, wherein each data identifier of the plurality of data identifiers is associated with transaction data associated with a transaction so that the transaction data associated with each transaction is separated by a data identifier; filter the streaming data using the at least one predetermined data identifier value to provide filtered data, wherein the filtered data comprises filtered transaction data associated with at least one transaction; determine whether the filtered transaction data associated with the at least one transaction corresponds to at least one predetermined transaction activity parameter based on filtering the streaming data using the at least one predetermined data identifier value; and asynchronously store the filtered transaction data associated with the at least one transaction in at least one data structure based on determining that the filtered transaction data associated with the at least one transaction corresponds to the at least one predetermined transaction activity parameter.

Clause 14: The system of clause 13, wherein the at least one processor, when asynchronously storing the filtered transaction data in the at least one data structure, is further programmed or configured to: asynchronously store the filtered transaction data in the at least one data structure based on a pull notification, wherein the pull notification is based on availability of the at least one data structure.

Clause 15: The system of clauses 13 or 14, wherein the at least one processor, when asynchronously storing the filtered transaction data in the at least one data structure, is further programmed or configured to: asynchronously store the filtered transaction data in a first data structure; communicate the filtered transaction data to a second data structure; and asynchronously store the filtered transaction data in the second data structure based on receiving the filtered transaction data, wherein the first data structure and the second data structure store data in a same data format.

Clause 16: The system of any of clauses 13-15, wherein the at least one predetermined data identifier value comprises a predetermined range of account identifiers, wherein the predetermined range of account identifiers is associated with an issuer institution that issues at least one account associated with the predetermined range of account identifiers.

Clause 17: The system of any of clauses 13-16, wherein the at least one predetermined transaction activity parameter comprises at least one of the following: a predetermined transaction amount of a transaction; information associated with a predetermined transaction amount of a plurality of transactions; information associated with a difference in a location of a first transaction and a location of a second transaction; information associated with a plurality of transactions conducted during a predetermined time interval; information associated with a type of transaction of a plurality of transactions conducted during a predetermined time interval; or any combination thereof.

Clause 18: The system of any of clauses 13-17, wherein each of the plurality of data identifiers comprises a key of a plurality of key value pairs, and wherein each portion of the transaction data comprises a value of the plurality of key value pairs, and wherein the at least one predetermined data identifier value comprises at least one predetermined key data parameter; and wherein the at least one processor, when filtering the streaming data using the at least one predetermined data identifier value to provide the filtered data, is further programmed or configured to: filter the streaming data using the at least one predetermined key data parameter to provide the filtered data.

Clause 19: A computer program product for performing analysis of transaction data, the computer program product comprising at least one non-transitory computer-readable medium including one or more instructions that, when executed by at least one processor, cause the at least one processor to: receive at least one predetermined data identifier value, wherein the at least one predetermined data identifier value is associated with at least one of information associated with a merchant data, information associated with an issuer institution, or any combination thereof; receive streaming data, wherein the streaming data comprises a plurality of data identifiers and transaction data associated with each transaction of a plurality of transactions, wherein each transaction involves at least one merchant and at least one consumer, wherein each data identifier of the plurality of data identifiers is associated with transaction data associated with a transaction so that the transaction data associated with each transaction is separated by a data identifier; filter the streaming data using the at least one predetermined data identifier value to provide filtered data, wherein the filtered data comprises filtered transaction data associated with at least one transaction; determine whether the filtered transaction data associated with the at least one transaction corresponds to at least one predetermined transaction parameter based on filtering the streaming data using the at least one predetermined data identifier value; asynchronously store the filtered transaction data associated with the at least one transaction in a first data structure based on determining that the filtered transaction data associated with the at least one transaction corresponds to the at least one predetermined transaction parameter; and asynchronously store the filtered transaction data associated with the at least one transaction in a second data structure based on a pull notification, wherein the pull notification is based on an availability of the second data structure to store the filtered transaction data.

Clause 20: The computer program product of clause 19, wherein the first data structure and the second data structure store data in a same data format.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

Figure 1:
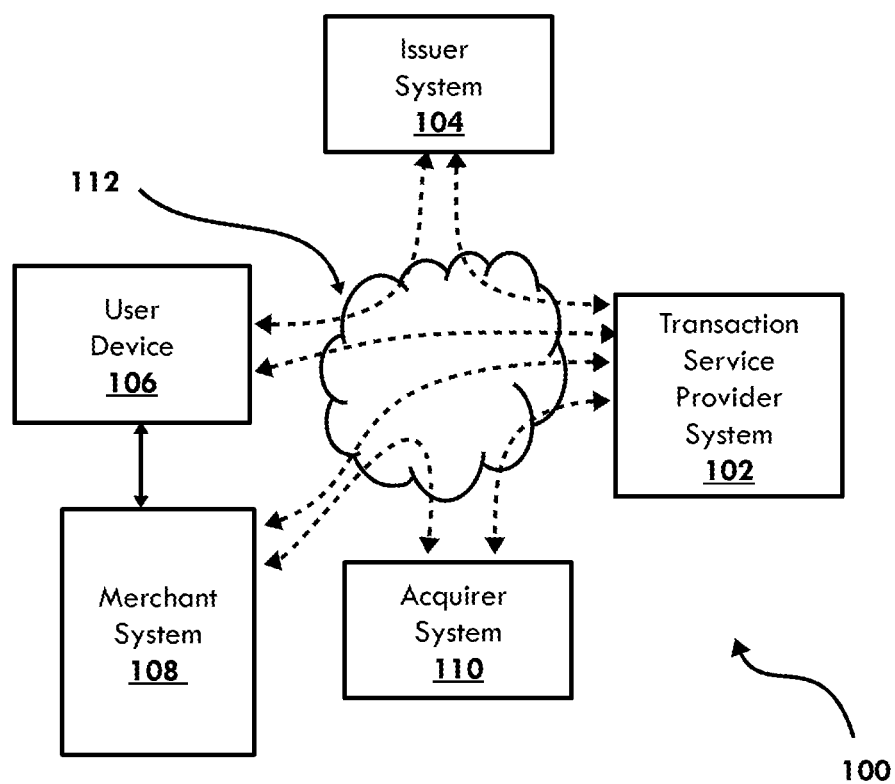
FIG. 1 is a diagram of a non-limiting embodiment of an environment in which systems, devices, products, apparatus, and/or methods, described herein, may be implemented according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No element, act, function, or instruction used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. It will be appreciated that numerous other arrangements are possible.

As used herein, the terms "issuer institution," "portable financial device issuer," "issuer," or "issuer bank" may refer to one or more entities that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, one or more repositories, one or more data repositories, one or more data tables, and/or the like) such that they may be used to conduct a transaction without directly using the original account identifier. In some examples, an original account identifier, such as a PAN, may be associated with a plurality of tokens for different individuals or purposes. An issuer institution may be associated with a bank identification number (BIN) or a range of BINs that uniquely identify the issuer institution.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. Tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses that provides goods and/or services, and/or access to goods and/or services, to a user (e.g., a customer, a consumer, a customer of the merchant, and/or the like) based on a transaction, such as a payment transaction. As used herein "merchant system" may refer to one or more computer systems operated by or on behalf of a merchant, such as a server computer executing one or more software applications. As used herein, a "merchant point-of-sale (POS) system" may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that may be used to initiate a payment transaction. A merchant POS system may also include one or more server computers programmed or configured to process online payment transactions through webpages, mobile applications, and/or the like. As used herein, the term "product" may refer to one or more goods and/or services offered by a merchant.

As used herein, a "point-of-sale (POS) system" may refer to one or more computers and/or peripheral devices used by a merchant to engage in payment transactions with customers, including one or more card readers, NFC receivers, RFID receivers, and/or other contactless transceivers or receivers, contact-based receivers, payment terminals, computers, servers, input devices, and/or other like devices that may be used to initiate a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, and in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions using a portable financial device associated with the transaction service provider. The transactions may include purchases, original credit transactions (OCTs), account funding transactions (AFTs), and other like payment transactions. The acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of payment facilitators and ensure proper due diligence occurs before signing a sponsored merchant. The acquirer may be liable for all transaction service provider programs that the transaction service provider operates or sponsors. The acquirer may be responsible for the acts of the acquirer's payment facilitators and the merchants or the acts of the merchants that the payment facilitators sponsor. An acquirer may be a financial institution, such as a bank. As used herein, the term "acquirer system" may also refer to one or more computer systems, computer devices, and/or the like operated by or on behalf of an acquirer, such as a server executing one or more software applications.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant, a pager, a security card, a computer, an access card, a wireless terminal, and/or a transponder, as examples. The portable financial device may include a volatile or a non-volatile memory to store information (e.g., an account identifier, a name of the account holder, and/or the like).

As used herein, the term "payment facilitator" may refer to a payment processing system operated by or on behalf of an entity (e.g., a merchant service provider) that contracts with an acquirer to provide transaction service provider payment services, using portable financial devices of the transaction service provider, to merchants sponsored by the payment facilitator. A payment facilitator may also refer to the entity that operates such a payment processing system. The payment facilitator may monitor all merchant activity sponsored by the payment facilitator in accordance with rules, regulations, and/or the like of the transaction service provider.

As used herein, the terms "client" and "client device" may refer to one or more client-side devices or systems, remote from a transaction service provider, used to initiate or facilitate a transaction. As an example, a "client device" may refer to one or more POS systems used by a merchant or one or more acquirer host computers used by an acquirer. It will be appreciated that a client device may be any electronic device configured to communicate with one or more networks and initiate or facilitate transaction such as, but not limited to, one or more computers, portable computers, tablet computers, cellular phones, wearable devices (e.g., watches, glasses, lenses, clothing, and/or the like), personal digital assistants (PDAs), and/or other like devices. Moreover, a "client" may also refer to an entity, such as a merchant or acquirer that owns, utilizes, and/or operates a client device for initiating transactions with a transaction service provider.

As used herein, the term "server" may refer to or include one or more computing devices, such as processors, storage devices, and/or similar computer components that communicate with client devices and/or other computing devices over a network environment, such as the internet or private networks, and, in some examples, facilitate communication among other servers and/or client devices. It will be appreciated that various other arrangements are possible. As used herein, the term "system" refers to one or more computing devices or combinations of computing devices, such as but not limited to processors, servers, client devices, software applications, and/or other like components.

Non-limiting embodiments of the present invention are directed to systems, methods, and computer program products that improve the performance of analysis of transaction data. Non-limiting embodiments of the invention allow for the improved detection of fraudulent activity that may be determined based on transaction data associated with an account (e.g., a credit card account, a debit card account, and/or the like).

Non-limiting embodiments of the present invention may include a computer-implemented method for performing analysis of transaction data that comprises receiving at least one predetermined data identifier value, wherein the at least one predetermined data identifier value is associated with at least one of information associated with a merchant data, information associated with an issuer institution, or any combination thereof, receiving streaming data, wherein the streaming data comprises a plurality of data identifiers and transaction data associated with each transaction of a plurality of transactions, wherein each transaction involves at least one merchant and at least one consumer, and wherein each data identifier of the plurality of data identifiers is associated with transaction data associated with a transaction so that the transaction data associated with each transaction is separated by a data identifier. By receiving streaming data, the present invention allows for real-time or near to real-time analysis of transaction data, which may provide immediate analysis of transaction data, for example, with regard to fraudulent activity that may be indicated based on the transaction data.

Additionally, the computer-implemented method may include filtering the streaming data using the at least one predetermined data identifier value to provide filtered data, wherein the filtered data comprises filtered transaction data associated with at least one transaction, determining whether the filtered transaction data associated with the at least one transaction corresponds to at least one predetermined transaction parameter, and asynchronously storing the filtered transaction data associated with the at least one transaction in at least one data structure based on determining that the filtered transaction data associated with the at least one transaction corresponds to the at least one predetermined transaction parameter. By asynchronously storing filtered transaction data, the present invention allows for increased throughput of filtered transaction data to a data structure. In this way, resources associated with providing the filtered transaction data to a data structure may be reduced when compared to synchronously storing the filtered transaction data.

Referring now to FIG. 1, FIG. 1 is a diagram of an example environment 100 in which devices, systems, and/or methods, described herein, may be implemented. As shown in FIG. 1, environment 100 includes a transaction service provider system 102, an issuer system 104, a user device 106, a merchant system 108, an acquirer system 110, and a network 112.

Transaction service provider system 102 may include one or more devices capable of receiving information from issuer system 104, user device 106, merchant system 108, and/or acquirer system 110 via network 112 and/or communicating information to issuer system 104, user device 106, merchant system 108, and/or acquirer system via network 112. For example, transaction service provider system 102 may include a computing device, a server, a group of servers, and/or other like devices. In some non-limiting embodiments, the transaction service provider system 102 may be associated with an entity (e.g., a transaction service provider) that operates a credit card network and that processes payments for credit accounts, debit accounts, credit cards, debit cards, and/or the like.

Issuer system 104 may include one or more devices capable of receiving information from transaction service provider system 102 and/or user device 106 via a network (e.g., network 112) and/or communicating information to transaction service provider system 102 and/or user device 106 via the network. For example, issuer system 104 may include a computing device, a server, a group of servers, and/or other like devices. In some non-limiting embodiments, the issuer system 104 may be associated with an issuer institution as described herein. For example, issuer system 104 may be associated with an issuer institution that issued a credit account, debit account, credit card, debit card, and/or the like to a user associated with user device 106.

User device 106 may include one or more devices capable of receiving information from transaction service provider system 102 and/or issuer system 104 via network 112 and/or communicating information to transaction service provider system 102 and/or issuer system 104 via network 112. User device 106 may also include a device capable of receiving information from merchant system 108 via a network (e.g., network 112), a communication connection (e.g., an NFC) connection, an RFID communication connection, a Bluetooth® communication connection, etc.), and/or the like, or communicating information to merchant system 108 via the network, the communication connection, and/or the like. For example, user device 106 may include a client device, a computer device, a desktop computer, a laptop computer, a mobile device, a cellular phone (e.g., a smartphone, standard cellular phone, etc.), a portable computer, a wearable device (e.g., a watch, glasses, lenses, clothing, etc.), a PDA, and/or other like devices. In some non-limiting embodiments, user device 106 may be capable of engaging in a transaction with merchant system 108.

Merchant system 108 may include one or more devices capable of receiving information from transaction service provider system 102 via network 112 and/or communicating information to transaction service provider system 102 via network 112. Merchant system 108 may also include one or more devices capable of receiving information from user device 106 and/or acquirer system 110 via a network 112, a communication connection (e.g., an NFC communication connection, an RFID communication connection, a Bluetooth® communication connection, and/or the like), and/or the like, and/or communicating information to user device 106 and/or acquirer system 110 via the network, the communication connection, and/or the like. For example, merchant system 108 may include a computing device, a server, a group of servers, a client device, a group of client devices, and/or other like devices. In some non-limiting embodiments, merchant system 108 may include one or more user devices 106. For example, merchant system 108 may include user device 106 that allows a merchant to communicate information to transaction service provider system 102.

In some non-limiting embodiments, merchant system 108 may include one or more devices, computers, computer systems, and/or peripheral devices capable of being used by a merchant to engage in a transaction with a user. Merchant system 108 may include one or more magnetic stripe card readers, chip card readers, NFC receivers, RFID receivers, and/or other contactless transceivers or receivers, contact-based receivers, payment terminals, computers, servers, input devices, and/or other like devices that can be used to engage in a transaction.

In some non-limiting embodiments, merchant system 108 may include and/or be in communication with a remote POS system, which may refer to a system that performs the functions of a POS device and is hosted in a network. A remote POS system may be hosted on one or more computers instead of, or in addition to, a physical POS device at a merchant location (e.g., a retail store, etc.). A remote POS system may be hosted in or remote to the merchant location. As an example, a remote POS system may be a virtual POS system hosted in a cloud-computing environment (e.g., a cloud POS system). The remote POS system may be unique to a specific merchant and may be hosted by the merchant, by a transaction service provider, by an issuer institution, and/or by a third party.

Acquirer system 110 may include a device capable of receiving information from transaction service provider system 102 and/or merchant system 108 via network 112 and/or communicating information to transaction service provider system 102 and/or merchant system 108 via network 112. For example, acquirer system 110 may include a computing device, a server, a group of servers, and/or other like devices. In some non-limiting embodiments, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
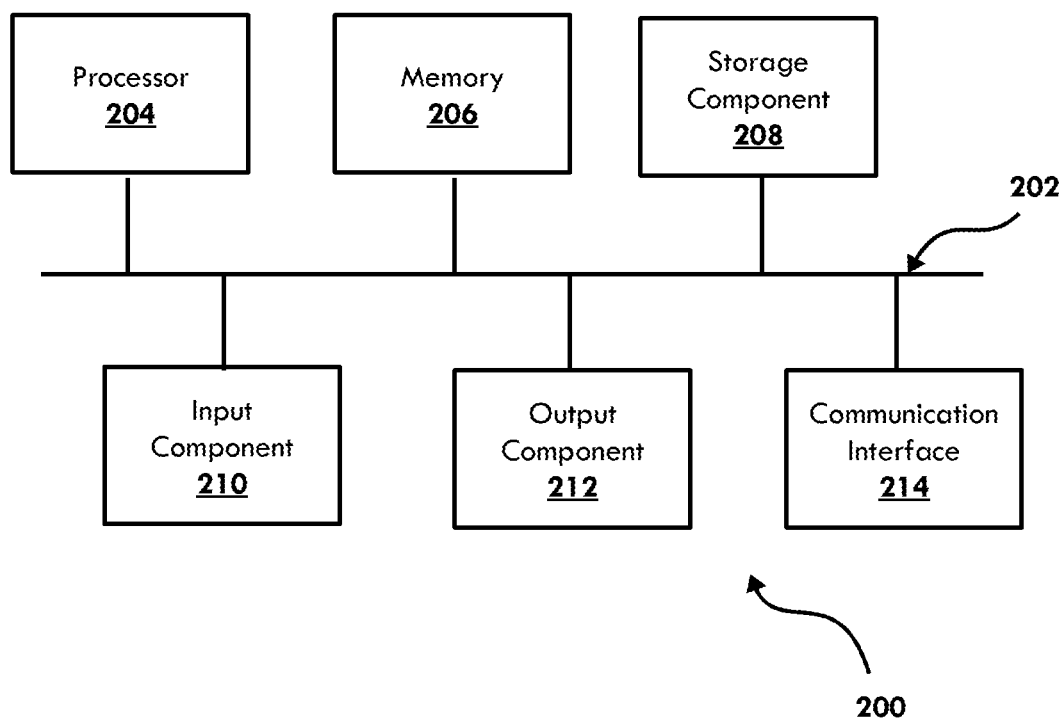
FIG. 2 is a diagram of a non-limiting embodiment of components of one or more devices of FIG. 1.

Referring now to FIG. 2, FIG. 2 is a diagram of example components of a device 200. Device 200 may correspond to transaction service provider system 102, issuer system 104, user device 106, merchant system 108, acquirer system 110 and/or one or more devices of transaction service provider system 102, issuer system 104, user device 106, merchant system 108, acquirer system 110. In some non-limiting embodiments, transaction service provider system 102, issuer system 104, user device 106, and/or merchant system 108 may include at least one device 200 and/or at least one component of device 200. As shown in FIG. 2, device 200 may include a bus 202, a processor 204, a memory 206, a storage component 208, an input component 210, an output component 212, and a communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include a random access memory (RAM), a read only memory (ROM), and/or another type of dynamic or static storage device (e.g., a flash memory, a magnetic memory, an optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
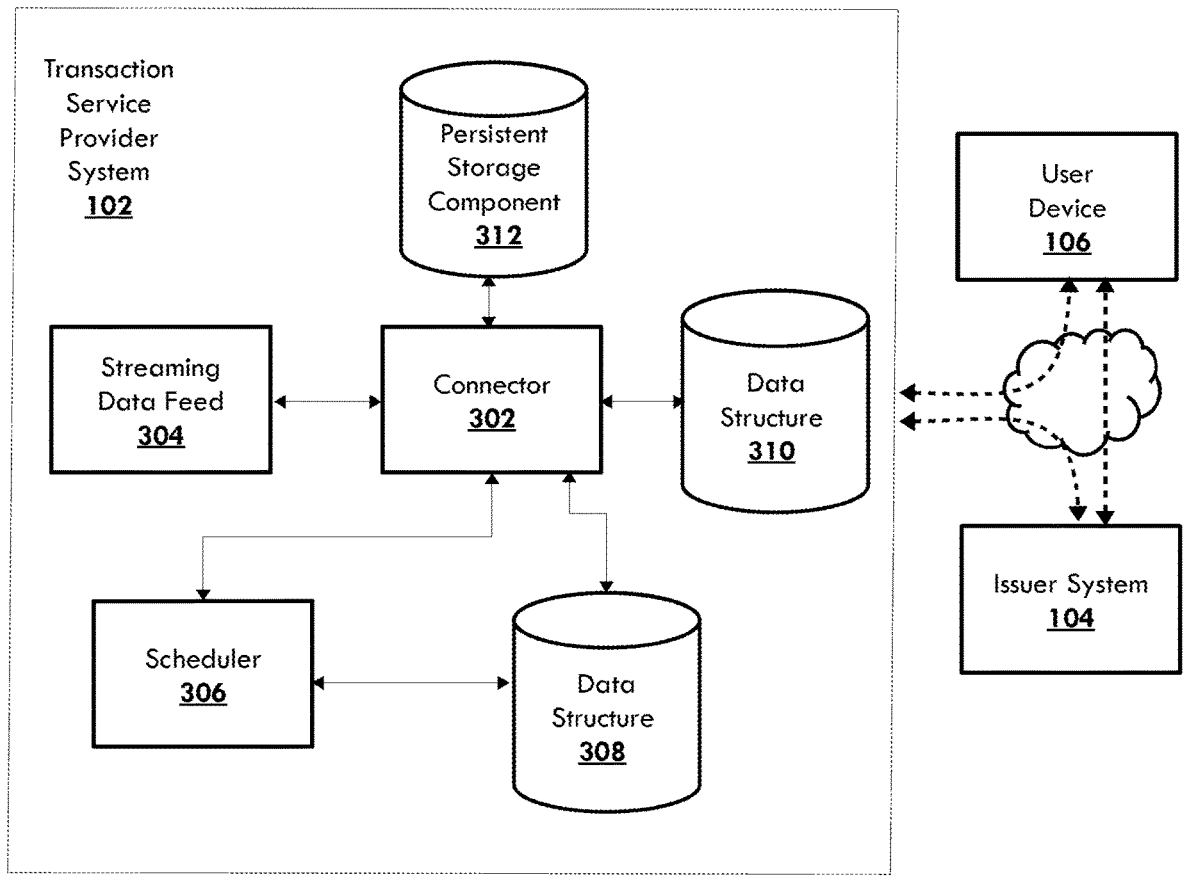
FIG. 3 is a diagram of a non-limiting embodiment of a transaction service provider system as shown in FIG. 1.

Referring now to FIG. 3, FIG. 3 is a diagram of non-limiting embodiment of the components of transaction service provider system 102 in which devices, systems, and/or methods, described herein, may be implemented. As shown in FIG. 3, transaction service provider system 102 may include a connector 302, a streaming data feed 304, a scheduler 306, a data structure 308, a data structure 310, and a persistent storage component 312. In some non-limiting embodiments, only one of data structure 308 or data structure 310 may be included in transaction service provider system 102. In some non-limiting embodiments, data structure 308 may perform all or some of the functions performed by data structure 310, or data structure 310 may perform all or some of the functions performed by data structure 308. In some non-limiting embodiments, connector 302, streaming data feed 304, scheduler 306, data structure 308, data structure 310, and/or persistent storage component 312 may include a computing device, a server, a group of servers, a computing device executing a virtual machine that performs specified functions, and/or other like devices. In some non-limiting embodiments, persistent storage component 312 may include memory storage device. For example, persistent storage component 312 may include may include a primary memory storage device (e.g., a cache memory, a main memory, and/or the like), a secondary memory storage device (e.g., a mass storage device, a hard drive, and/or the like), and/or an off-line storage device (e.g., a removable media drive, a removable storage medium, and/or the like) associated with connector 302. In some non-limiting embodiments, persistent storage component 312 may allow connector 302 to store information such that the information persists in persistent storage component 312 in the event of an outage of connector 302. In some non-limiting embodiments, data structure 308 and/or data structure 310 may be a structured query language (SQL) data structure, a NoSQL data structure, and/or the like. In some non-limiting embodiments, data structure 308 and/or data structure 310 may be implemented using available data structure software, such as, for example Rocks DB, Apache HBase, and/or the like. In some non-limiting embodiments, streaming data feed 304 may be implemented using available data streaming software, such as, for example Apache Kafka, and/or the like. In some non-limiting embodiments, streaming data feed 304 may communicate data using an authentication function and the authentication function may be based on a lightweight token authentication (LTA) process, and/or the like.

In some non-limiting embodiments, data structure 308 and/or data structure 310 may be a distributed data structure (e.g., a distributed data structure associated with transaction service provider system 102). In some non-limiting embodiments, data structure 308 and/or data structure 310 may be local or remote to transaction service provider system 102. For example, data structure 308 and/or data structure 310 may be a component of transaction service provider system 102 or data structure 308, and/or data structure 310 may not be a component of transaction service provider system 102 (e.g., data structure 308 and/or data structure 310 may be a component of another system).

In some non-limiting embodiments, the functions specified by connector 302, streaming data feed 304, scheduler 306, data structure 308, and/or data structure 310 may be implemented on a computing device, a group of computing devices, a server, a group of servers, one or more virtual machines executed by one or more computing devices, one or more virtual machines executed in a cloud computing environment, and/or the like. In some non-limiting embodiments, connector 302 may be capable of receiving information from streaming data feed 304, scheduler 306, data structure 308, data structure 310, and/or persistent storage component 312, and/or communicating information to streaming data feed 304, scheduler 306, data structure 308, data structure 310, and/or persistent storage component 312. In some non-limiting embodiments, streaming data feed 304, scheduler 306, data structure 308, data structure 310, and/or persistent storage component 312 may be capable of receiving information from connector 302 and/or communicating information to connector 302.

Figure 4:
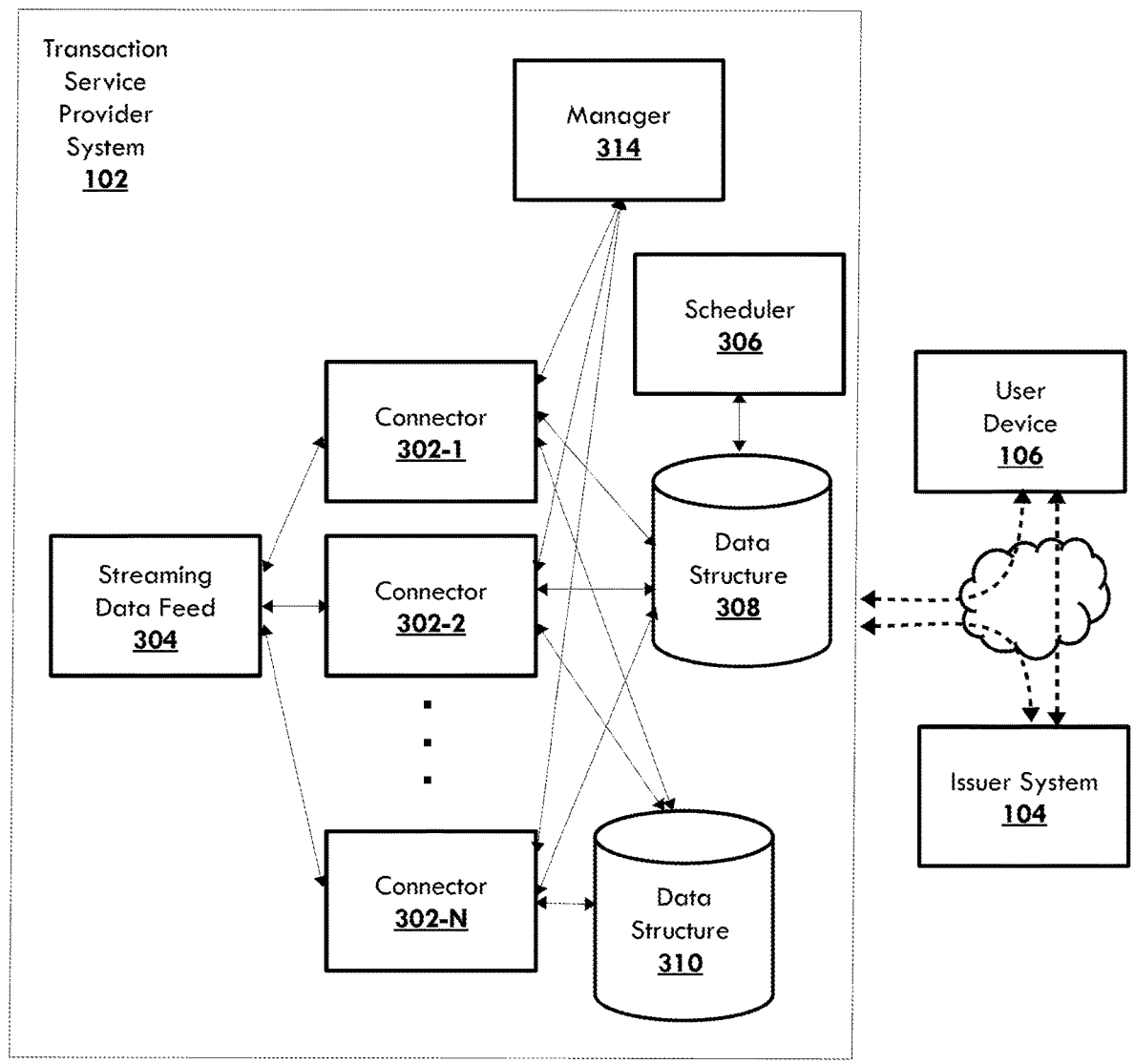
FIG. 4 is a diagram of another non-limiting embodiment of a transaction service provider system as shown in FIG. 1.

Referring now to FIG. 4, FIG. 4 is a diagram of the components of a non-limiting embodiment of transaction service provider system 102 in which devices, systems, and/or methods, described herein, may be implemented. As shown in FIG. 4, transaction service provider system 102 may include one or more connectors 302-1 through 302-N, streaming data feed 304, data structure 308, data structure 310, and manager 314. As referred to herein, one or more of connectors 302-1 through 302-N may perform the same or similar functions as connector 302 described above with regard to FIG. 3. Accordingly, connectors 302-1 through 302-N may be collectively referred to as "connectors 302" and may be individually referred to as "connector 302". In some non-limiting embodiments, manager 314 may monitor, control, receive information from, and/or communicate information to one or more of connectors 302. For example, where one or more of connectors 302 include one or more virtual machines (e.g., one or more instances of one or more virtual machines), manager 314 may monitor the status of, control one or more functions of, receive information from, and/or communicate information to the one or more virtual machines. In some non-limiting embodiments, manager 314 may be implemented as an application running Cloudera Manager.

In some non-limiting embodiments, connectors 302-1 through 302-N may include virtual machines that are instantiated based on streaming data received from streaming data feed 304. For example, where the amount of streaming data received from streaming data feed 304 is greater than an amount of streaming which a single connector 302 (e.g., connector 302-1) may process, transaction service provider system 102 may instantiate another connector 302 (e.g., connector 302-N) to process an additional amount of streaming data. In another example, transaction service provider system 102 may divide the streaming data (e.g., via streaming data feed 304) into one or more partitions, and a number of connectors 302 (e.g., connector 302-1 through connector 302-N) may be instantiated based on a number of one or more partitions of the streaming data.

In some non-limiting embodiments, only one of data structure 308 or data structure 310 may be included in transaction service provider system 102. In some non-limiting embodiments, data structure 308 may perform all or some of the functions performed by data structure 310 or data structure 310 may perform all or some of the functions performed by data structure 308. In some non-limiting embodiments, connector 302, streaming data feed 304, scheduler 306, data structure 308, and/or data structure 310 may include a computing device, a server, a group of servers, a computing device executing a virtual machine that performs specified functions, and/or other like devices. In some non-limiting embodiments, the functions specified by connector 302, streaming data feed 304, scheduler 306, data structure 308, and/or data structure 310 may be implemented on a computing device, a group of computing devices, a server, a group of servers, one or more virtual machines executed by one or more computing devices, one or more virtual machines executed in a cloud computing environment, and/or the like.

The number and arrangement of components shown in FIGS. 3 and 4 are provided as examples. In some non-limiting embodiments, transaction service provider system 102 may include additional components, fewer components, different components, or differently arranged components than those shown in FIGS. 3 and 4. Additionally, or alternatively, a set of components (e.g., one or more components) of transaction service provider system 102 may perform one or more functions described as being performed by another set of components of transaction service provider system 102. Additionally, as shown in FIGS. 3 and 4, transaction service provider system 102 may communicate information, for example, via connector 302, via streaming data feed 304, via scheduler 306, via data structure 308, and/or via data structure 310, to user device 106 and/or issuer system 104.

In some non-limiting embodiments, connector 302 may be capable of receiving data (e.g., streaming data) associated with a universal message format (UMF) from streaming data feed 304. For example, connector 302 may receive the information from streaming data feed 304 in real-time or near to real-time. In some non-limiting embodiments, connector 302 may include functionality to intercept, filter and asynchronously store (e.g., write, and/or the like) information into a NoSQL data structure (e.g., data structure 308, data structure 310).

In some non-limiting embodiments, connector 302 may be implemented based on a Flafka framework (e.g., a framework that combines aspects of Apache Kafka and Apache Flume) and may be backed by an Apache Flume architecture. In this way, connector 302 may be a distributed, reliable, and available service for efficiently collecting, aggregating, and moving streaming data. Additionally, connector 302 may have a simple and flexible architecture based on streaming data and may be robust and fault tolerant with tunable reliability mechanisms for failover and recovery.

Figure 5:
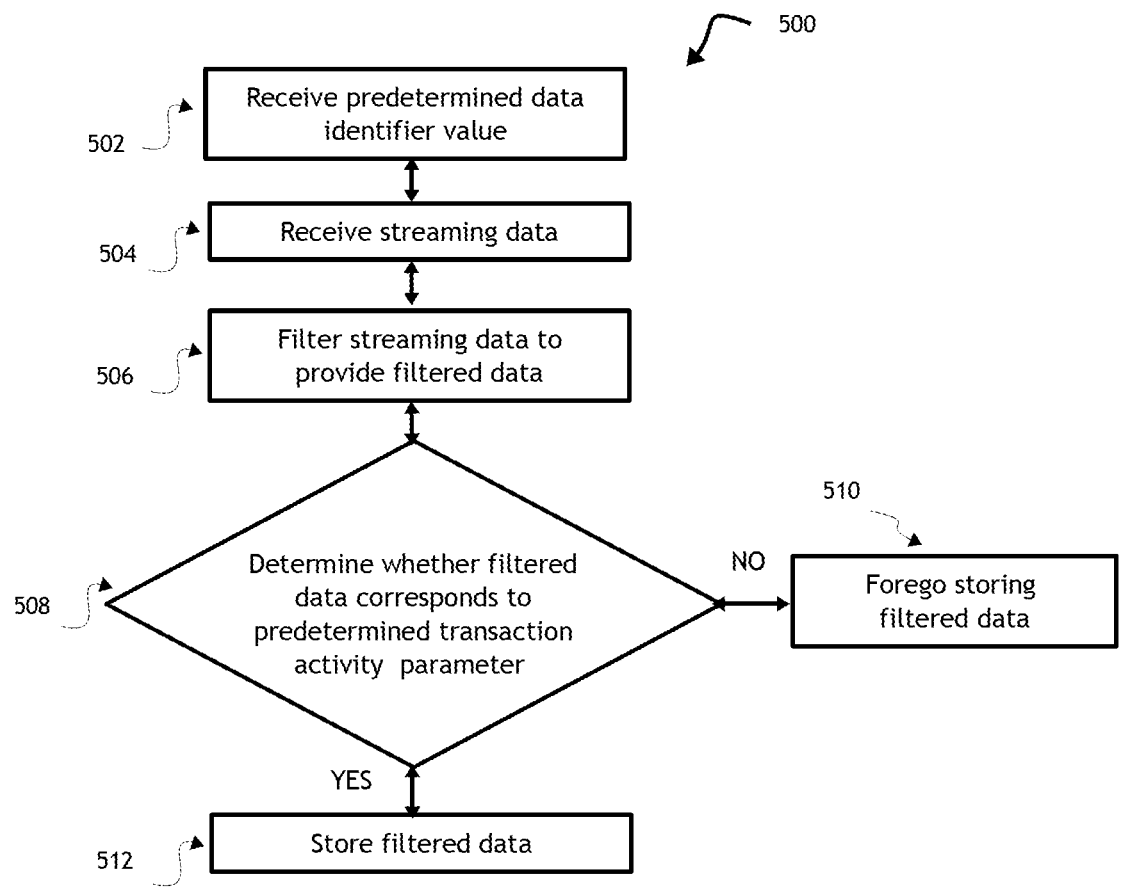
FIG. 5 is a flowchart of a non-limiting embodiment of a process for performing analysis on transaction data according to the principles of the present invention.

Referring now to FIG. 5, FIG. 5 is a flowchart of a non-limiting embodiment of a process 500 for performing analysis on transaction data. In some non-limiting embodiments, one or more of the steps of process 500 may be performed (e.g., completely, partially, etc.) by one or more components of transaction service provider system 102, such as connector 302. In some non-limiting embodiments, one or more of the steps of process 500 may be performed (e.g., completely, partially, etc.) by another component or a group of components separate from or including connector 302, such as streaming data feed 304, scheduler 306, data structure 308, data structure 310, or persistent storage component 312. Additionally or alternatively, one or more of the steps of process 500 may be performed (e.g., completely, partially, etc.) by another device or a group of devices separate from or including transaction service provider system 102, such as issuer system 104 (e.g., one or more devices of issuer system 104), user device 106, merchant system 108 (e.g., one or more devices of merchant system 108), or acquirer system 110 (e.g., one or more devices of acquirer system 110).

As shown in FIG. 5, at step 502, process 500 includes receiving a predetermined data identifier value. For example, connector 302 may receive the predetermined data identifier value (e.g., a predetermined transaction data identifier value) from streaming data feed 304, scheduler 306, data structure 308, data structure 310, and/or persistent storage component 312. In some non-limiting embodiments, connector 302 may receive the predetermined data identifier value from an issuer institution (e.g., an issuer institution associated with issuer system 104), a merchant (e.g., a merchant associated with merchant system 108), a user (e.g., a user associated with user device 106), and/or an acquirer (e.g., an acquirer associated with acquirer system 110). For example, an issuer institution, a merchant, a user, and/or an acquirer may communicate the predetermined data identifier value to scheduler 306, and scheduler 306 may communicate (e.g., communicate at a predetermined interval, communicate at a daily interval, communicate at an hourly interval, and/or the like) the predetermined data identifier value to connector 302. In some non-limiting embodiments, connector 302 may receive the predetermined data identifier value included as part of a job (e.g., a job request file, an e-receipts job file, a command file, and/or the like). In some non-limiting embodiments, scheduler 306 may receive the predetermined data identifier value as part of a job, and scheduler 306 may store the job in data structure 308. In some non-limiting embodiments, scheduler 306 may store the job in data structure 308 in a file format (e.g., an SST file, and/or the like). Additionally, scheduler 306 and/or data structure 308 may regularly back up the job stored in data structure 308.

In some non-limiting embodiments, connector 302 may receive a job (e.g., a job including a predetermined data identifier value) stored in data structure 308. For example, connector 302 may receive the job based on lookup (e.g., a lookup based on a query, a read-only lookup, and/or the like) to data structure 308. By receiving the job based on read-only lookup, connector 302 may receive the job with greater speed than a lookup that was not read-only.

In some non-limiting embodiments, the predetermined data identifier value may include predetermined information associated with an issuer institution (e.g., an issuer institution associated with issuer system 104), predetermined information associated with a merchant (e.g., a merchant associated with merchant system 108), predetermined information associated with a user (e.g., a user associated with user device 106), predetermined information associated with an acquirer (e.g., an acquirer associated with acquirer system 110), and/or the like.

In some non-limiting embodiments, the predetermined information associated with an issuer institution may include predetermined information associated with an identity of an issuer institution (e.g., predetermined key data associated with an identity of an issuer institution, a predetermined unique identifier of the issuer institution, a predetermined name of the issuer institution, a predetermined issuer identification number (IIN) associated with the issuer institution, a predetermined BIN associated with the issuer institution, a predetermined range of IINs and/or BINs associated with the issuer institution, and/or the like), and/or the like.

In some non-limiting embodiments, the predetermined information associated with a merchant may include predetermined information associated with an identity of a merchant (e.g., predetermined key data associated with an identity of a merchant, a predetermined unique identifier of the merchant, a predetermined name of the merchant, and/or the like), predetermined information associated with a merchant category of a merchant (e.g., predetermined key data associated with a merchant category of the merchant, a predetermined code for a merchant category of the merchant, a predetermined name of a merchant category of the merchant, a predetermined type of a merchant category of the merchant, and/or the like), predetermined information associated with an account of the merchant (e.g., predetermined key data associated with an account of the merchant, a predetermined account identifier associated with an account of the merchant, a predetermined account identifier associated with an account of the merchant provided by an acquirer associated with acquirer system 110, a predetermined PAN associated with an account of the merchant, a token associated with an account of the merchant, and/or the like), and/or the like.

In some non-limiting embodiments, the predetermined information associated with an acquirer may include predetermined information associated with an identity of an acquirer (e.g., predetermined key data associated with an identity of the acquirer, a predetermined unique identifier of the acquirer, a predetermined name of the acquirer, and/or the like), predetermined information associated with an account (e.g., a merchant account) provided by the acquirer (e.g., predetermined key data associated with an account provided by the acquirer, a predetermined account identifier associated with an account provided by the acquirer, a predetermined PAN associated with an account provided by the acquirer, a token associated with an account provided by the acquirer, and/or the like), and/or the like.

In some non-limiting embodiments, predetermined information associated with a user information associated with an identity of a user associated with user device 106 (e.g., predetermined key data associated with an identity of the user, a predetermined unique identifier of the user, a predetermined name of the user, and/or the like), predetermined information associated with an account of a user (e.g., a predetermined account identifier associated with the user, a predetermined PAN associated with a credit and/or debit account of the user, a predetermined token associated with a credit and/or debit account of the user, and/or the like), and/or the like.

In some non-limiting embodiments, the predetermined data identifier value may include predetermined information associated with a subscriber to a service. For example, an issuer institution associated with issuer system 104 may subscribe to a service that is intended to provide detection of fraudulent account activity associated with an account issued by the issuer institution. The predetermined data identifier value may include predetermined information associated with an identity of the issuer institution (e.g., a predetermined range of account identifiers associated with accounts issued by the issuer institution, a predetermined range of IINs associated with the issuer institution, a predetermined range of BINs associated with the issuer institution, and/or the like). Additionally or alternatively, a subscriber may include a merchant associated with merchant system 108, a user associated with user device 106, an acquirer associated with acquirer system 110, and/or the like.

As shown in FIG. 5, at step 504, process 500 includes receiving streaming data. For example, connector 302 may receive streaming data from streaming data feed 304. In some non-limiting embodiments, the streaming data may include a plurality of data identifiers and transaction data associated with each transaction of a plurality of transactions involving a merchant and a customer (e.g., a customer of the merchant). In some non-limiting embodiments, a data identifier may be associated with each transaction of the plurality of transactions. For example, a first data identifier may be associated with transaction data of a first transaction of the plurality of transactions, a second data identifier may be associated with transaction data of a second transaction of the plurality of transactions, and/or the like. Accordingly, each data identifier of the plurality of data identifiers may be associated with the transaction data so that the transaction data associated with each individual transaction is separated by a data identifier.

In some non-limiting embodiments, the streaming data includes a plurality of key value pairs, where the key data of each key value pair comprises a data identifier, and where the value data of each key value pair comprises transaction data (e.g., transaction data associated with a transaction) associated with the data identifier of the key data.

In some non-limiting embodiments, connector 302 and/or streaming data feed 304 may receive the streaming data in a serialized data format (e.g., Avro binary format, and/or the like). In some non-limiting embodiments, connector 302 and/or streaming data feed 304 may deserialize the streaming data into a deserialized data format (e.g., Avro container format, JavaScript Object Notation (JSON), and/or the like).

In some non-limiting embodiments, the streaming data includes transaction data associated with a plurality of transactions. For example, the streaming data may include transaction data associated with a plurality of transactions, where the transaction data is independent of a data identifier associated with each transaction of the plurality of transactions.

In some non-limiting embodiments, the streaming data may be partitioned before connector 302 receives the streaming data. For example, streaming data feed 304 may partition the streaming data before communicating the streaming data to connector 302. In some non-limiting embodiments, streaming data feed 304 may communicate the partitioned streaming data based on partitioning the streaming data.

In some non-limiting embodiments, the plurality of transactions involving the merchant and the customer may be past transactions (e.g., transactions that have been authorized, cleared, and/or settled). For example, the plurality of transactions may have been completed, settled, and/or the like before the streaming data, which includes transaction data associated with the plurality of transactions, is received by connector 302. In some non-limiting embodiments, the streaming data may include real-time transaction data associated with a transaction (e.g., a transaction that has not been authorized, cleared, and/or settled).

In some non-limiting embodiments, the transaction data associated with the transaction may include information associated with a transaction amount of a transaction (e.g., a transaction amount, an overall transaction amount, a cost of each product involved, and/or the like), information associated with an identifier of a transaction (e.g., a reference number, a unique identifier, a transaction identifier, a transaction ID, a unique transaction identifier (UTI), a merchant order number, and/or the like), information associated with a product involved in a transaction (e.g., a name of the product, a name of a type of product, a stock keeping unit (SKU) number associated with a product, a merchant code associated with a product, and/or the like), information associated with a time of a transaction (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like, and/or the like), information associated with a transaction type of a transaction (e.g., an online transaction, a card present transaction, a face-to-face transaction, and/or the like), information associated with a transaction status of a transaction (e.g., completed, incomplete, processed, unprocessed, and/or the like), and/or the like.

Additionally or alternatively, the transaction data associated with a transaction may include information associated with a user (e.g., a customer, a consumer, and/or the like) involved in a transaction, information associated with a merchant involved in a transaction, information associated with an acquirer that provided an account (e.g., a merchant account) to a merchant involved in a transaction, information associated with an issuer institution that issued an account (e.g., a credit account, a debit account, and/or the like) involved in a transaction, and/or the like.

In some non-limiting embodiments, the information associated with a user may include information associated with an identity of the user (e.g., a unique identifier of the user, a name of the user, and/or the like), information associated with an account of the user (e.g., an account identifier associated with the user, a PAN associated with a credit and/or debit account of the user, a token associated with a credit and/or debit account of the user, and/or the like), and/or the like.

In some non-limiting embodiments, the information associated with the merchant may include information associated with an identity of the merchant (e.g., a unique identifier of the merchant, a name of the merchant, and/or the like), information associated with a merchant category of the merchant (e.g., a code for a merchant category, a name of a merchant category, a type of a merchant category, and/or the like), information associated with a merchant account of the merchant (e.g., an account identifier associated with an account of the merchant, an account identifier associated with an account of the merchant provided by an acquirer associated with acquirer system 110, a PAN associated with an account of the merchant, a token associated with an account of the merchant, and/or the like), and/or the like.

In some non-limiting embodiments, the information associated with an acquirer may include information associated with an identity of an acquirer (e.g., a unique identifier of the acquirer, a name of the acquirer, and/or the like), information associated with an account (e.g., a merchant account) provided by the acquirer (e.g., an account identifier associated with an account provided by the acquirer, a PAN associated with an account provided by the acquirer, a token associated with an account provided by the acquirer, and/or the like), and/or the like.

In some non-limiting embodiments, the information associated with the issuer institution may include information associated with an identity of the issuer institution (e.g., a unique identifier of the issuer institution, a name of the issuer institution, an IIN associated with the issuer institution, a BIN associated with the issuer institution, and/or the like), and/or the like.

In some non-limiting embodiments, streaming data feed 304 may partition the streaming data before receiving the streaming data. By partitioning the streaming data, streaming data feed 304 may provide first partitioned streaming data and second partitioned streaming data to connector 302 (e.g., connector 302-1, connector 302-2, and/or the like, based on the number of partitions of streaming data). Streaming data feed may communicate the first partitioned streaming data and the second partitioned streaming data based on partitioning the streaming data, and connector 302 may receive the first partitioned streaming data and the second partitioned streaming data.

As shown in FIG. 5, at step 506, process 500 includes filtering the streaming data. For example, connector 302 may filter the streaming data received from streaming data feed 304 using the predetermined data identifier value to provide filtered data (e.g., a portion of the streaming data, a subset of the streaming data, and/or the like). In some non-limiting embodiments, the filtered data may include filtered transaction data associated with at least one transaction. The filtered transaction data may include transaction data associated with at least one data identifier that corresponds to the at least one predetermined data identifier value. In some non-limiting embodiments, connector 302 may filter (e.g., automatically) the streaming data based on receiving the streaming data.

In some non-limiting embodiments, connector 302 may filter the streaming data received from streaming data feed 304 using predetermined information associated with a transaction (e.g., predetermined information associated with a user involved in a transaction, predetermined information associated with a merchant involved in a transaction, predetermined information associated with an acquirer, predetermined information associated with an issuer institution that issued an account involved in a transaction, and/or the like) to provide filtered data. In some non-limiting embodiments, the filtered data may include filtered transaction data associated with at least one transaction. The filtered transaction data may be associated with transaction data that corresponds to the predetermined information associated with a transaction.

In some non-limiting embodiments, connector 302 may filter the streaming data by determining whether a data identifier associated with transaction data included in the streaming data corresponds to the predetermined data identifier value. If connector 302 determines that a data identifier associated with transaction data included in the streaming data corresponds to the predetermined data identifier value, the transaction data associated with the data identifier that corresponds the predetermined data identifier value may provide the filtered data. If connector 302 determines that a data identifier associated with transaction data included in the streaming data does not correspond to the at least one predetermined data identifier value, the transaction data associated with the data identifier that does not correspond to the predetermined data identifier value may not be provided as the filtered data.

In some non-limiting embodiments, connector 302 may filter the streaming data using predetermined information associated with a transaction by determining whether transaction data associated with each transaction of a plurality of transactions, which was included in the streaming data, corresponds to the predetermined information associated with a transaction. If connector 302 determines that transaction data associated with a transaction of the plurality of transactions corresponds to the predetermined information associated with a transaction, the transaction data associated with the transaction that corresponds to the predetermined information associated with a transaction may provide the filtered data. If connector 302 determines that transaction data associated with a transaction of the plurality of transactions does not correspond to the predetermined information associated with a transaction, the transaction data associated with the transaction that does not correspond to the predetermined information associated with a transaction may not provide the filtered data. The filtered transaction data may be associated with at least one data identifier that corresponds to the predetermined data identifier value.

In some non-limiting embodiments, connector 302 may filter the streaming data by querying a data structure (e.g., data structure 308, data structure 310) that stores the streaming data using the predetermined data identifier value and/or the predetermined information associated with a transaction.

In some non-limiting embodiments, the predetermined data identifier value may include a predetermined key data parameter (e.g., a specific value of key data, a parameter of key data associated with a user, an issuer institution, a merchant, an acquirer, and/or the like), and connector 302 may filter the streaming data using the at least one predetermined key data parameter to provide the filtered data.

In some non-limiting embodiments, connector 302 may filter the streaming data using the at least one predetermined data identifier value to provide filtered data, where the filtered data comprises the deserialized data format. For example, connector 302 may receive the streaming data in a serial data format. Connector 302 may deserialize the streaming data into a deserialized data format, and connector 302 may filter the streaming data using the at least one predetermined data identifier value to provide filtered data, where the filtered data comprises the deserialized data format In some non-limiting embodiments, connector 302 may determine a characteristic of the filtered data. For example, connector 302 may determine the characteristic of the filtered data, where the characteristic comprises an identity of an issuer institution, an identity of a user, an identity of an acquirer, and/or an identity of a merchant associated with filtered transaction data of the filtered data.

In some non-limiting embodiments, connector 302 may store the filtered data in a storage component (e.g., persistent storage component 312). For example, connector 302 may store the filtered data in the storage component based on information associated with a priority of the filtered data.

As shown in FIG. 5, at step 508, process 500 includes determining whether the filtered data corresponds to a predetermined transaction activity parameter. For example, connector 302 may determine whether the filtered transaction data of the filtered data corresponds to the predetermined transaction activity parameter. In some non-limiting embodiments, connector 302 may determine whether the filtered transaction data of the filtered data corresponds to the predetermined transaction activity parameter based on filtering the streaming data.

In some non-limiting embodiments, the predetermined transaction activity parameter may include predetermined information associated with a transaction (e.g., predetermined information associated with a user involved in a transaction, predetermined information associated with a merchant involved in a transaction, predetermined information associated with an acquirer, predetermined information associated with an issuer institution that issued an account involved in a transaction, and/or the like). In some non-limiting embodiments, the predetermined transaction activity parameter may include information associated with an indication of act of fraud committed using an account (e.g., an account of a user, an account issued by an issuer institution, a credit card account, a debit card account, and/or the like). For example, the predetermined transaction activity parameter may include information associated with the commission of an act of fraud (e.g., a predetermined transaction amount of a transaction, information associated with a predetermined transaction amount of a plurality of transactions, information associated with a difference in the location of a first transaction and the location of a second transaction, information associated with a plurality of transactions conducted during a predetermined time interval, information associated with a type of transaction of a plurality of transactions conducted during a predetermined time interval, and/or the like).

In some non-limiting embodiments, connector 302 may determine whether the filtered data corresponds to the predetermined transaction activity parameter by querying a data structure (e.g., data structure 310) using the predetermined transaction activity parameter, creating a map of the results of the query, and storing the map in the data structure.

In some non-limiting embodiments, connector 302 may communicate information associated with determining that the filtered data corresponds to the predetermined transaction activity parameter. For example, connector 302 may communicate a message (e.g., a notification message, a notification message using HyperText Markup Language (HTML), a notification message using Hypertext Transfer Protocol (HTTP), and/or the like) to issuer system 104, user device 106, merchant system 108, and/or acquirer system 110 based on determining that the filtered data corresponds to the predetermined transaction activity parameter. The message may include information associated with determining that the filtered data corresponds to the predetermined transaction activity parameter, information associated with the filtered data, and/or the like. In some non-limiting embodiments, the information associated with determining that the filtered data corresponds to the predetermined transaction activity parameter may include an indication that suspected fraudulent activity has been conducted.

As shown in FIG. 5, at step 510, process 500 includes foregoing storing of filtered data. For example, connector 302 may forego storing the filtered transaction data of the filtered data based on determining that the filtered transaction data does not correspond to the predetermined transaction activity parameter. In some non-limiting embodiments, connector 302 may forego storing the filtered transaction data of the filtered data by deleting (e.g., overwriting, deleting after a predetermined time interval, and/or the like) the filtered transaction data.

As shown in FIG. 5, at step 512, process 500 includes storing the filtered data. For example, connector 302 may store (e.g., synchronously store, asynchronously store) the filtered transaction data of the filtered data in a data structure (e.g., data structure 310) based on determining that the filtered transaction data corresponds to the predetermined transaction activity parameter.

In some non-limiting embodiments, connector 302 may asynchronously store the filtered transaction data in a data structure (e.g., data structure 310, data structure 308). For example, connector 302 may asynchronously store the filtered transaction data based on determining that the filtered transaction data corresponds to the predetermined transaction data parameter. In some non-limiting embodiments, the filtered transaction data may include filtered transaction data associated with each transaction of a plurality of transactions where the filtered transaction data of each transaction corresponds to the predetermined transaction data parameter. Accordingly, connector 302 may asynchronously store the filtered transaction data associated with each transaction in a data structure (e.g., data structure 310, data structure 308) during a single time interval instead of storing the filtered transaction data associated with each transaction in the data structure in sequential order at separate time intervals. For example, connector 302 may store first filtered transaction data associated with a first transaction, second filtered transaction data associated with a second transaction, and third filtered transaction data associated with a third transaction as a batch during a single time interval instead of synchronously storing first filtered transaction, the second filtered transaction data, and third filtered transaction data sequentially during a single time interval.

By storing filtered transaction data asynchronously, connector 302 may increase the throughput of connector 302 to a data structure as compared to storing the filtered transaction data synchronously. In addition, by storing filtered transaction data asynchronously, the scalability and fault tolerance of connector 302 may be increased as compared to storing the filtered transaction data synchronously.

In some non-limiting embodiments, connector 302 may store (e.g., synchronously, asynchronously) the streaming data by storing the filtered transaction data associated with the at least one transaction in a first data structure based on determining that the filtered transaction data associated with the at least one transaction corresponds to the at least one predetermined transaction parameter. Further, connector 302 may retrieve the filtered transaction data from the first data structure and store the filtered transaction data associated with the at least one transaction in a second data structure based on a pull notification. In some non-limiting embodiments, the pull notification is based on an availability of the second data structure to store the filtered transaction data. In some non-limiting embodiments, the first data structure and the second data structure store data in a same data format.

In some non-limiting embodiments, connector 302 may asynchronously store the filtered transaction data associated with each transaction in a data structure based on a pull mechanism. For example, connector 302 may asynchronously store the filtered transaction data in the data structure based on a pull mechanism, where the pull mechanism indicates that the data structure is available (e.g., alive).

Figure 6:
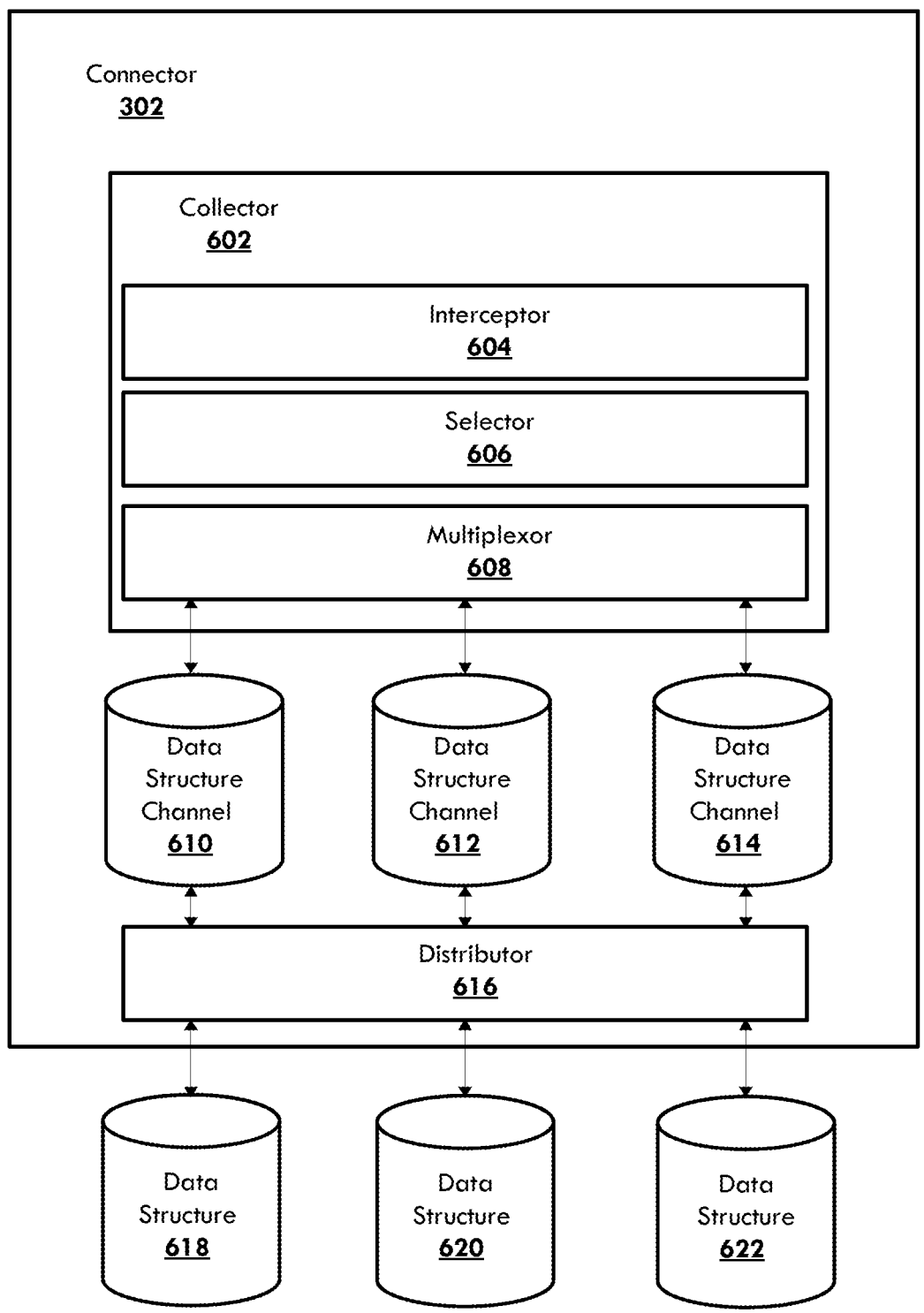
FIG. 6 is a diagram of a non-limiting embodiment of a connector as shown in FIG. 1 and FIG. 3.

Referring now to FIG. 6, FIG. 6 is a diagram of the components of a non-limiting embodiment of connector 302 in which devices, systems, and/or methods, described herein, may be implemented. As shown in FIG. 6, connector 302 may include a collector 602, an interceptor 604, a selector 606, a multiplexor 608, a data structure channel 610, a data structure channel 612, a data structure channel 614, and a distributor 616. In some non-limiting embodiments, only one or two of data structure channel 610, data structure channel 612, and data structure channel 614 may be included in connector 302. In some non-limiting embodiments, each of data structure channel 610, data structure channel 612, and data structure channel 614 may perform all or some of the functions performed by another data structure channel 610, data structure channel 612, and data structure channel 614, respectively. In some non-limiting embodiments, collector 602, interceptor 604, selector 606, multiplexor 608, data structure channel 610, data structure channel 612, data structure channel 614, and/or distributor 616 may include a computing device, a server, a group of servers, a computing device executing a virtual machine that performs specified functions, and/or other like devices. In some non-limiting embodiments, a data structure channel (e.g., data structure channel 610, data structure channel 612, data structure channel 614) may include a data structure that is used to communicate information stored in the data structure.

In some non-limiting embodiments, data structure channel 610 may provide data (e.g., transaction data, filtered data, filtered transaction data, and/or the like) to a data structure 618, data structure channel 612 may provide data to a data structure 620, and data structure channel 614 may provide data to a data structure 622 based on instructions (e.g., commands, and/or the like) from distributor 616.

Figure 7:
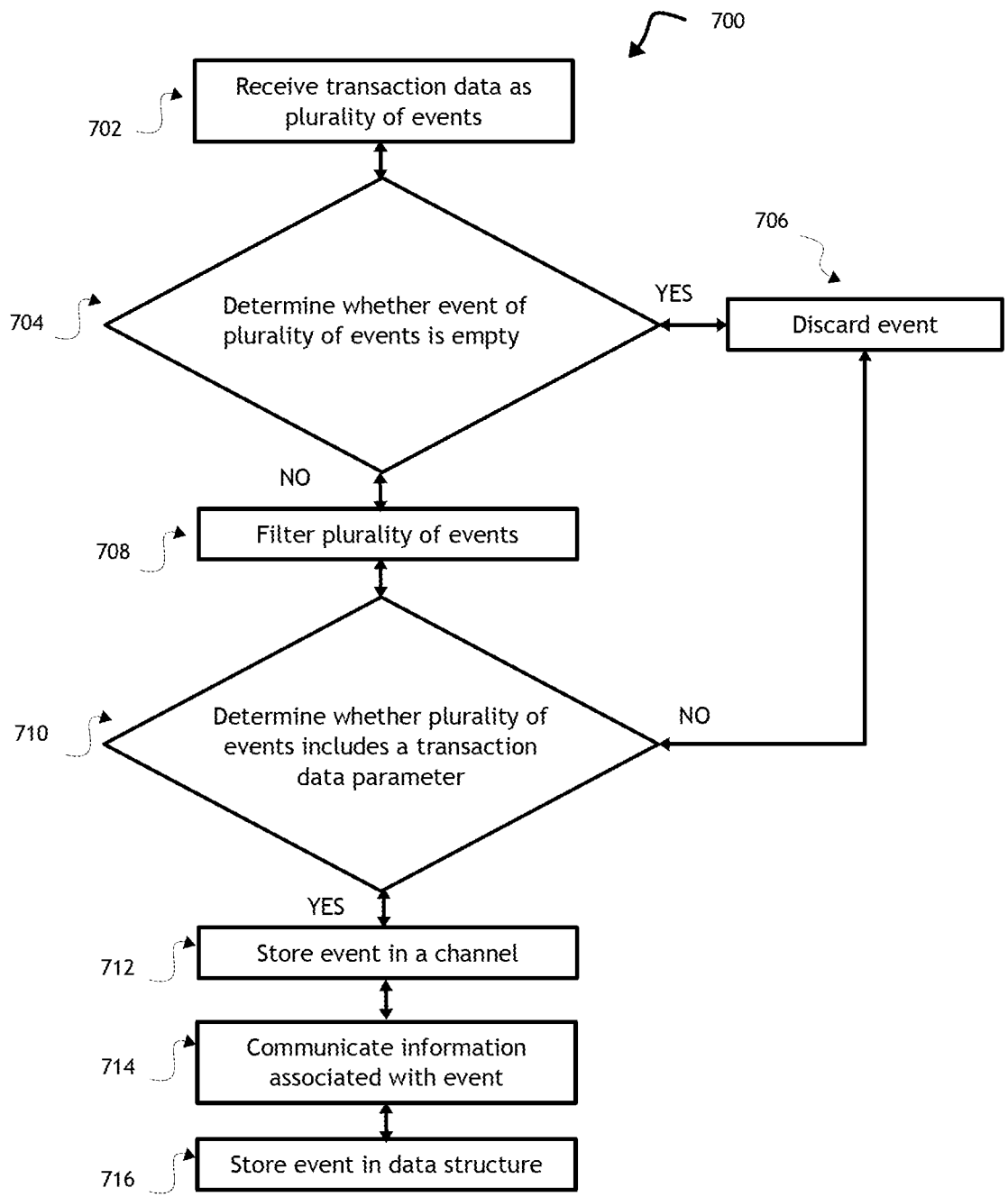
FIG. 7 is a flowchart of a non-limiting embodiment of a process for performing analysis on transaction data according to the principles of the present invention.

Referring now to FIG. 7, FIG. 7 is a flowchart of a non-limiting embodiment of a process 700 for performing analysis on transaction data. In some non-limiting embodiments, one or more of the steps of process 700 may be performed (e.g., completely, partially, etc.) by one or more components of connector 302, such as collector 602. In some non-limiting embodiments, one or more of the steps of process 700 may be performed (e.g., completely, partially, etc.) by another component or a group of components separate from or including collector 602, such as interceptor 604, selector 606, multiplexor 608, and/or distributor 616. Additionally or alternatively, one or more of the steps of process 700 may be performed (e.g., completely, partially, etc.) by another device or a group of devices separate from or including connector 302, such as streaming data feed 304, scheduler 306, data structure 308, data structure 310, persistent storage component 312, and/or manager 314.

As shown in FIG. 7, at step 702, process 700 includes receiving transaction data as a plurality of events. For example, collector 602 may receive transaction data as a plurality of events from streaming data feed 304. At step 704, process 700 includes determining whether an event of the plurality of events is empty. For example, collector 602 may determine whether an event of the plurality of events is empty (e.g., null). In some non-limiting embodiments, interceptor 604 may receive an event of the plurality of events based on determining that the event is not empty (e.g., not null). At step 706, process 700 includes discarding (e.g., deleting) an event based on determining that the event is empty. For example, collector 602 may discard the event based on collector 602 determining that the event is empty. At step 708, process 700 includes filtering the plurality of events. For example, collector 602 (e.g., via interceptor 604) may filter the plurality of events. At step 710, process 700 includes determining whether the filtered plurality of events includes a transaction data parameter. For example, collector 602 may determine whether the filtered plurality of events includes the transaction data parameter. In some non-limiting embodiments, collector 602 may determine that a filtered event of the plurality of filtered events includes the transaction data parameter. Accordingly, collector 602 may determine that the filtered event is valid and/or appropriate (e.g., interested). In some non-limiting embodiments, collector 602 may determine that one or more filtered events of the filtered plurality of events does not include the transaction data parameter. Accordingly, process 700 includes discarding (e.g., at step 706) the one or more filtered events based on determining that the one or more events does not include the transaction data parameter.

As further shown in FIG. 7, at step 712, process 700 includes storing a filtered event in a data structure channel. For example, collector 602 may store the filtered event in a data structure channel (e.g., data structure channel 610, data structure channel 612, data structure channel 614). In some non-limiting embodiments, interceptor 604 may communicate the filtered event to selector 606, and selector 606 may communicate the filtered event to multiplexor 608 to provide the filtered event to one of data structure channel 610, data structure channel 612, or data structure channel 614 based on information associated with the filtered event.

As further shown in FIG. 7, at step 714, process 700 includes connector 302 (e.g., via collector 602) communicating information associated with the filtered event to a user (e.g., a user associated with user device 106), to an issuer institution (e.g., an issuer institution associated with issuer system 104), to a merchant (e.g., a merchant associated with merchant system 108), and/or to an acquirer (e.g., an acquirer associated with acquirer system 110). For example, connector 302 may communicate the information associated with the filtered event to the user, the issuer institution, the merchant, and/or the acquirer based on determining that the filtered event includes the transaction data parameter and/or storing the filtered event in the data structure channel. In some non-limiting embodiments, distributor 616 may receive the filtered event stored in a data structure channel (e.g., data structure channel 610, data structure channel 612, data structure channel 614). For example, distributor 616 may receive the filtered event based on a pull mechanism. The pull mechanism may allow distributor 616 to pull the filtered event from the data structure channel (e.g., data structure channel 610, data structure channel 612, data structure channel 614).

In some non-limiting embodiments, connector 302 (e.g., via collector 602) may invoke a destination application programming interface (API) (e.g., an asynchronous API) and determine whether the destination (e.g., data structure 618, data structure 620, data structure 622) for the filtered event is available (e.g., alive). If connector 302 determines that the destination for the filtered event is not available, connector 302 may invoke a destination API for a different destination than the previous destination and proceed to determine if the different destination is available. In some non-limiting embodiments, connector 302 may repeat this until a destination is found that is available. If connector 302 determines that the destination for the filtered event is available, connector 302 stores (e.g., commits) the filtered event at the destination.

As further shown in FIG. 7, at step 716, process 700 includes connector 302 storing the filtered event (e.g., information associated with the filtered event) in a data structure. For example, connector 302 may store the filtered event in data structure 618, data structure 620, and/or data structure 622.

In some non-limiting embodiments, connector 302 (e.g., via distributor 616, multiplexor 608, and/or the like) may remove the filtered event from a data structure channel (e.g., data structure channel 610, data structure channel 612, data structure channel 614). For example, connector 302 may remove the filtered event from the data structure channel based on and/or after storing the filtered event at the destination (e.g., data structure 618, data structure 620, data structure 622).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for performing analysis of transaction data, comprising:

receiving, with at least one processor, at least one predetermined key data parameter, wherein the at least one predetermined key data parameter is associated with at least one of information associated with a merchant data, information associated with an issuer institution, or any combination thereof;

receiving, with at least one processor, streaming data, wherein the streaming data comprises a plurality of key value pairs, wherein the key data of each key value pair comprises a data identifier of a plurality of data identifiers and value data of each key value pair comprises transaction data associated with each transaction of a plurality of transactions, wherein each transaction involves at least one merchant and at least one consumer, wherein each data identifier of the plurality of data identifiers is associated with transaction data so that the transaction data associated with each individual transaction of the plurality of transactions is separated by an individual data identifier of the plurality of data identifiers;

filtering, with at least one processor, the streaming data using the at least one predetermined key data parameter to provide filtered data, wherein the filtered data comprises filtered transaction data associated with at least one transaction that corresponds to value data of a key value pair, and wherein the key value pair includes the at least one predetermined key data parameter;

determining, with at least one processor, whether the filtered transaction data associated with the at least one transaction corresponds to at least one predetermined transaction activity parameter, wherein determining whether the filtered transaction data corresponds to the at least one predetermined transaction activity parameter comprises:

determining that the filtered transaction data associated with a plurality of transactions corresponds to the at least one predetermined transaction activity parameter;

communicating, with at least one processor, a notification message based on determining that the filtered transaction data associated with the at least one transaction corresponds to the at least one predetermined transaction activity parameter; and asynchronously storing, with at least one processor, the filtered transaction data associated with the at least one transaction in at least one data structure based on determining that the filtered transaction data associated with the at least one transaction corresponds to the at least one predetermined transaction activity parameter, wherein asynchronously storing the filtered transaction data in the at least one data structure comprises:

asynchronously storing the filtered transaction data in the at least one data structure based on a pull notification, wherein the pull notification is based on availability of the at least one data structure to store the filtered transaction data.

2. The computer-implemented method of claim 1, wherein the at least one data structure comprises a distributed data structure associated with a transaction service provider system.

3. The computer-implemented method of claim 1, wherein asynchronously storing the filtered transaction data in the at least one data structure comprises:

storing the filtered transaction data associated with the plurality of transactions in the at least one data structure as a batch in a single time interval.

4. The computer-implemented method of claim 1, wherein asynchronously storing the filtered transaction data in the at least one data structure comprises:

asynchronously storing the filtered transaction data in at least one NoSQL data structure.

5. The computer-implemented method of claim 1, wherein asynchronously storing the filtered transaction data in the at least one data structure comprises:

asynchronously storing the filtered transaction data in a first data structure;

communicating the filtered transaction data to a second data structure;

and storing the filtered transaction data in the second data structure, wherein the first data structure and the second data structure store data in a same data format.

6. The computer-implemented method of claim 1, wherein the transaction data associated with each transaction of the plurality of transactions of the streaming data comprises real-time transaction data associated with each transaction of the plurality of transactions.

7. The computer-implemented method of claim 1, further comprising:

partitioning the streaming data before receiving the streaming data to provide first partitioned streaming data and second partitioned streaming data; and communicating the first partitioned streaming data and the second partitioned streaming data based on partitioning the streaming data, wherein receiving the streaming data comprises:

receiving the first partitioned streaming data and the second partitioned streaming data.

8. The computer-implemented method of claim 1, wherein the notification message comprises an indication that suspected fraudulent activity has been conducted.

9. The computer-implemented method of claim 1, further comprising storing the filtered transaction data in a memory storage device associated with the at least one processor before storing the filtered transaction data in the at least one data structure.

10. The computer-implemented method of claim 1, wherein the streaming data is received in a serial data format, the method further comprising:

deserializing the streaming data into a deserialized data format, and wherein filtering the streaming data using the at least one predetermined data identifier value to provide filtered data comprises:

filtering the streaming data using the at least one predetermined data identifier value to provide filtered data, wherein the filtered data comprises the deserialized data format.

11. The computer-implemented method of claim 1, wherein the at least one predetermined transaction activity parameter comprises at least one of the following:

a predetermined transaction amount of a transaction;

information associated with a predetermined transaction amount of a plurality of transactions;

information associated with a difference in a location of a first transaction and a location of a second transaction;

information associated with a plurality of transactions conducted during a predetermined time interval;

information associated with a type of transaction of a plurality of transactions conducted during a predetermined time interval; or any combination thereof.

12. A system for performing analysis of transaction data, comprising:

at least one processor, wherein the at least one processor is programmed or configured to:

receive at least one predetermined key data parameter, wherein the at least one predetermined key data parameter is associated with at least one of information associated with a merchant data, information associated with an issuer institution, or any combination thereof;

receive streaming data, wherein the streaming data comprises a plurality of key value pairs, wherein the key data of each key value pair comprises a data identifier of a plurality of data identifiers and value data of each key value pair comprises transaction data associated with each transaction of a plurality of transactions, wherein each transaction involves at least one merchant and at least one consumer, wherein each data identifier of the plurality of data identifiers is associated with transaction data so that the transaction data associated with each individual transaction of the plurality of transactions is separated by an individual data identifier of the plurality of data identifiers;

filter the streaming data using the at least one predetermined key data parameter to provide filtered data, wherein the filtered data comprises filtered transaction data associated with at least one transaction that corresponds to value data of a key value pair, and wherein the key value pair includes the at least one predetermined key data parameter;

determine whether the filtered transaction data associated with the at least one transaction corresponds to at least one predetermined transaction activity parameter based on filtering the streaming data using the at least one predetermined data identifier value; and asynchronously store the filtered transaction data associated with the at least one transaction in at least one data structure based on determining that the filtered transaction data associated with the at least one transaction corresponds to the at least one predetermined transaction activity parameter, wherein when asynchronously storing the filtered transaction data in the at least one data structure, the at least one processor is programmed or configured to:

asynchronously store the filtered transaction data in the at least one data structure based on a pull notification, wherein the pull notification is based on availability of the at least one data structure to store the filtered transaction data.

13. The system of claim 12, wherein the at least one processor, when asynchronously storing the filtered transaction data in the at least one data structure, is further programmed or configured to:

asynchronously store the filtered transaction data in a first data structure;

communicate the filtered transaction data to a second data structure; and asynchronously store the filtered transaction data in the second data structure based on receiving the filtered transaction data, wherein the first data structure and the second data structure store data in a same data format.

14. The system of claim 12, wherein the at least one predetermined key data parameter comprises a predetermined range of account identifiers, wherein the predetermined range of account identifiers is associated with an issuer institution that issues at least one account associated with the predetermined range of account identifiers.

15. The system of claim 12, wherein the at least one predetermined transaction activity parameter comprises at least one of the following:

a predetermined transaction amount of a transaction;

information associated with a predetermined transaction amount of a plurality of transactions;

information associated with a difference in a location of a first transaction and a location of a second transaction;

information associated with a plurality of transactions conducted during a predetermined time interval;
information associated with a type of transaction of a plurality of transactions conducted during a predetermined time interval; or
any combination thereof.

16. A computer program product for performing analysis of transaction data, the computer program product comprising at least one non-transitory computer-readable medium including one or more instructions that, when executed by at least one processor, cause the at least one processor to:
receive at least one predetermined key data parameter, wherein the at least one predetermined key data parameter is associated with at least one of information associated with a merchant data, information associated with an issuer institution, or any combination thereof;
receive streaming data, wherein the streaming data comprises a plurality of key value pairs, wherein the key data of each key value pair comprises a data identifier of a plurality of data identifiers and value data of each key value pair comprises transaction data associated with each transaction of a plurality of transactions, wherein each transaction involves at least one merchant and at least one consumer, wherein each data identifier of the plurality of data identifiers is associated with transaction data so that the transaction data associated with each individual transaction of the plurality of transactions is separated by an individual data identifier of the plurality of data identifiers;
filter the streaming data using the at least one predetermined key data parameter to provide filtered data, wherein the filtered data comprises filtered transaction data associated with at least one transaction;
determine whether the filtered transaction data associated with the at least one transaction corresponds to at least one predetermined transaction activity parameter based on filtering the streaming data using the at least one predetermined data identifier value;
asynchronously store the filtered transaction data associated with the at least one transaction in a first data structure based on determining that the filtered transaction data associated with the at least one transaction corresponds to the at least one predetermined transaction activity parameter; and
asynchronously store the filtered transaction data associated with the at least one transaction in a second data structure based on a pull notification, wherein the pull notification is based on an availability of the second data structure to store the filtered transaction data.

17. The computer program product of claim 16, wherein the first data structure and the second data structure store data in a same data format.

18. The computer program product of claim 16, wherein the at least one predetermined transaction activity parameter comprises at least one of the following:
a predetermined transaction amount of a transaction;
information associated with a predetermined transaction amount of a plurality of transactions;
information associated with a difference in a location of a first transaction and a location of a second transaction;
information associated with a plurality of transactions conducted during a predetermined time interval;
information associated with a type of transaction of a plurality of transactions conducted during a predetermined time interval; or
any combination thereof.

* * * * *